(12) United States Patent
Yandrasits et al.

(10) Patent No.: US 11,834,544 B2
(45) Date of Patent: Dec. 5, 2023

(54) ANION EXCHANGE MEMBRANES BASED ON POLYMERIZATION OF LONG CHAIN ALPHA OLEFINS

(71) Applicants: 3M Innovative Properties Company, St. Paul, MN (US); The Penn State Research Foundation, University Park, PA (US)

(72) Inventors: Michael A. Yandrasits, Hastings, MN (US); Carl A. Laskowski, Minneapolis, MN (US); Timothy M. Gillard, St. Paul, MN (US); Michael Hickner, State College, PA (US); Liang Zhu, Boca Raton, FL (US)

(73) Assignees: 3M Innovative Properties Company, Saint Paul, MN (US); The Penn State Research Foundation, University Park (PA)

( * ) Notice: Subject to any disclaimer, the term of this patent is extended or adjusted under 35 U.S.C. 154(b) by 657 days.

(21) Appl. No.: 16/980,320

(22) PCT Filed: Mar. 11, 2019

(86) PCT No.: PCT/US2019/021573
§ 371 (c)(1),
(2) Date: Sep. 11, 2020

(87) PCT Pub. No.: WO2019/177944
PCT Pub. Date: Sep. 19, 2019

(65) Prior Publication Data
US 2021/0032378 A1 Feb. 4, 2021

Related U.S. Application Data

(60) Provisional application No. 62/641,895, filed on Mar. 12, 2018.

(51) Int. Cl.
| | |
|---|---|
| *C08F 8/32* | (2006.01) |
| *C08F 8/44* | (2006.01) |
| *C08F 210/08* | (2006.01) |
| *C08F 212/12* | (2006.01) |
| *C08F 214/16* | (2006.01) |
| *C08F 214/18* | (2006.01) |
| *C08J 5/22* | (2006.01) |
| *H01M 8/1004* | (2016.01) |

(52) U.S. Cl.
CPC ............... *C08F 8/32* (2013.01); *C08F 8/44* (2013.01); *C08F 210/08* (2013.01); *C08F 212/12* (2013.01); *C08F 214/16* (2013.01); *C08F 214/18* (2013.01); *C08J 5/2243* (2013.01); *H01M 8/1004* (2013.01)

(58) Field of Classification Search
USPC ......................................................... 521/32
See application file for complete search history.

(56) References Cited

U.S. PATENT DOCUMENTS

| | | |
|---|---|---|
| 4,503,217 A | 3/1985 | Alexander et al. |
| 4,558,101 A | 12/1985 | Jachimowicz et al. |
| 4,657,984 A | 4/1987 | McEntire et al. |
| 5,382,629 A | 1/1995 | Coran et al. |
| 5,434,309 A | 7/1995 | McGrath et al. |
| 5,559,193 A | 9/1996 | McGrath et al. |
| 6,103,676 A | 8/2000 | Coolbaugh et al. |
| 6,248,798 B1 | 6/2001 | Slingsby et al. |
| 7,589,081 B2 | 9/2009 | Zapf et al. |
| 8,748,330 B2 | 6/2014 | Debe et al. |
| 8,927,776 B2 | 1/2015 | Franke et al. |
| 9,493,397 B2 | 11/2016 | Coates et al. |
| 2005/0215825 A1 | 9/2005 | Briggs et al. |
| 2009/0156699 A1 | 6/2009 | MacDonald et al. |
| 2010/0137460 A1 | 6/2010 | Bert et al. |
| 2012/0035280 A1 | 2/2012 | Jikihara et al. |
| 2013/0296499 A1 | 11/2013 | Coates et al. |
| 2014/0107237 A1 | 4/2014 | Yan et al. |
| 2016/0367980 A1 | 12/2016 | Inomata et al. |
| 2017/0174800 A1 | 6/2017 | Isomura et al. |

FOREIGN PATENT DOCUMENTS

| | | |
|---|---|---|
| EP | 0603146 A1 | 6/1994 |
| JP | 2004346140 A | 12/2004 |
| JP | 2009173898 A | 8/2009 |
| WO | 2016/168468 A2 | 10/2016 |
| WO | 2017/109429 A1 | 6/2017 |

OTHER PUBLICATIONS

McGrath, et al., "Functionalization of Polymers by Metal-Mediated Processes", 1995, Chem. Rev. 95:381-398.
Tremont, et al., "Hydroformylation of 1,2- and 1,4-Polybutadiene and Their Mixtures with Hydridocarbonyltris (triphenylphosphine)rhodium(I) Catalyst and Excess Triphenylphosphine", 1990, Macromolecules, 23:1984-1993.
Ndoni et al., "Laboratory-scale setup for anionic polymerization under inert atmosphere", Feb. 1995, Rev. Sci. Instrum., 66(2):1090-1095.
Wu, et al., "Efficient and Regioselective Ruthenium-catalyzed Hydroaminomethylation of Olefins", Feb. 18, 2013, J. Am. Chem. Soc., 135(10):3989-3996.
Wu, et al., "Ruthenium-Catalyzed Hydroformylation/Reduction of Olefins to Alcohols: Extending the Scope to Internal Alkenes", Aug. 29, 2013, J. Am. Chem. Soc., 135:14306-14312.
Zhang, et al., "Facilitating Anion Transport in Polyolefin-Based Anion Exchange Membranes via Bulky Side Chains" Aug. 16, 2016, ACS Appl. Mater. Interfaces, 8:23321-23330.

(Continued)

*Primary Examiner* — Fred M Teskin
(74) *Attorney, Agent, or Firm* — Mueting Raasch Group

(57) ABSTRACT

Described herein are cationic polymers having a plurality of quaternary amino groups, methods of making such polymers, and uses of such polymers as ion exchange membranes in electrochemical devices.

15 Claims, No Drawings

(56) References Cited

OTHER PUBLICATIONS

Zhang, et al., "Highly stable anion exchange membranes based on quaternized polypropylene", Apr. 30, 2015, J. Mater. Chem. A, 3:12284-12296.

Zhang, et al., "New Polyethylene Based Anion Exchange Membranes (PE-AEMs) with High Ionic Conductivity", Jul. 14, 2011, Macromolecules, 44:5937-5946.

Zhu, et al., "Multication Side Chain Anion Exchange Membranes", Macromolecules, Jan. 25, 2016, 49:815-824.

International Patent Application No. PCT/US2019/021573, filed Mar. 11, 2019, International Search Report and Written Opinion dated Jun. 18, 2019, 10 pages.

Zhu, et al., "Exploring backbone-cation alkyl spacers for multi-cation side chain anion exchange membranes", 2018, Journal of Power Sources, 375:433-441. Available online Jun. 16, 2017.

International Patent Application No. PCT/US2019/021573, filed Mar. 11, 2019, International Preliminary Report on Patentability, dated Sep. 15, 2020, 7 pages.

ANION EXCHANGE MEMBRANES BASED ON POLYMERIZATION OF LONG CHAIN ALPHA OLEFINS

CROSS REFERENCE TO RELATED APPLICATION

This application is the § 371 U.S. National Stage of International Application No. PCT/US2019/021573, filed 11 Mar. 2019, which claims the benefit of U.S. Provisional Patent Application No. 62/641,895, filed Mar. 12, 2018, disclosures of which are incorporated by reference herein in their entireties.

GOVERNMENT RIGHTS

This invention was made with Government support under Contract No. DE-AR0000776 awarded by DOE. The Government has certain rights in this invention.

TECHNICAL FIELD

Polymeric ion exchange membranes for electrochemical devices are disclosed.

BACKGROUND

The successful commercialization of base-stable anion exchange membranes has yet to be realized due to the difficulty in (i) obtaining a polyelectrolyte capable of withstanding highly basic media (pH>14) for extended periods of time without degradation and (ii) having sufficiently low membrane ionic resistance to allow for high efficiency in a cell. The interest in developing durable anion exchange membranes (AEM) over proton exchange membranes (PEM) results from the cost-advantage in metal catalysts used in an AEM versus a PEM fuel cell and electrolyzer technology, and related electrochemical applications.

SUMMARY

There is a desire to prepare cationic polymers having a plurality of quaternary amino groups, that can be used to make solid, polymeric membranes, including membranes that can be used as polymneric anion exchange membranes with high charge densities and high durability in highly basic media. Such cationic polymers include polymers having pendant groups comprising at least two, at least three, at least four or more cationic groups. One benefit that these cations confer upon the polymer, as a whole, is improved conductivity, coupled with a reduced swelling ratio, when the cationic polymers are used in anion exchange membranes. Although the swelling ratio may well increase with increasing number of cations, it does not increase as much when the pendant groups comprise at least two, at least three, at least four or more cationic groups in, for example, a chain. The swelling ratio can be less than 50 percent swelling or less, but a swelling ratio of 30 percent or less can be achieved with pendant groups comprising at least two, at least three, at least four or more cationic groups in, for example, a chain.

To that end, the instant disclosure relates to:

A method for preparing a cationic polymer having a plurality of quaternary amino groups, the method comprising:

obtaining or providing a precursor polymer comprising x repeat units of Formula (I) and y repeat units of Formula (II)

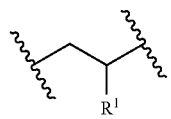
(I)

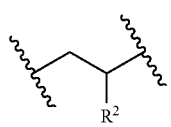
(II)

wherein each R is independently an aralkyl or a substituted aralkyl;

each R is independently pendant $*-R^3-L$ groups,

R is alkylene having at least four carbon atoms;

L is a leaving group;

the asterisk (*) represents the point of attachment of $R^3$ to the polymer backbone;

the variable x represents an overall mole fraction of the repeat units of Formula (I) in the precursor polymer, with random or block repeat unit distribution;

the variable y represents an overall mole fraction of the repeat units of Formula (II) in the precursor polymer, with random or block monomer repeat unit distribution, wherein y is in a range of about 0.15 to about 0.35; and reacting the pendant $*-R^3-L$ groups (which correspond to $R^2$ groups) of the precursor polymer with a cationic amine compound having at least one tertiary amino group and at least one quaternary amino group to form the cationic polymer having the plurality of pendant quaternary amino groups, wherein the cationic polymer having the plurality of pendant quaternary amino groups comprises x repeat units of Formula (I) and z repeat units of Formula (IV)

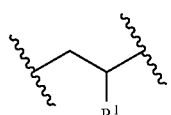
(I)

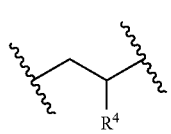
(IV)

wherein each $R^4$ is independently a cationic group of the Formula (V) or Formula (VI)

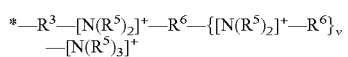

$$*-R^3-[N(R^5)_2]^+-R^6-\{[N(R^5)_2]^+-R^6\}_y-[N(R^5)_3]^+ \quad (V)$$

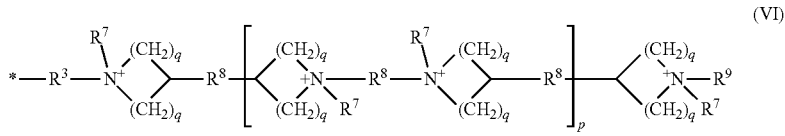

each $R^5$ is independently alkyl;
each $R^6$ is independently alkylene;
v is an integer in a range of 0 to 10;
each $R^7$ is an alkyl;
each R is an alkylene;
each $R^9$ is an alkyl;
each q is independently an integer in a range of 1 to 2; and
p is an integer in a range of 0 to 10; and
the variable z represents the overall mole fraction of the repeat units of Formula (IV) in the cationic polymer, with random or block monomer repeat unit distribution, wherein z is in a range of 0.15 to about 0.35; and
the cationic group has corresponding anionic counter ions.

A cationic polymer comprising x repeat units of Formula (I) and z repeat units of Formula (IV)

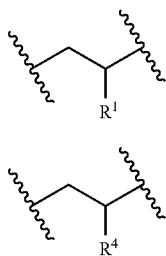

(I)

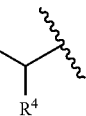

(IV)

wherein
each $R^1$ is independently an aralkyl or substituted aralkyl;
the variable x represents an overall mole fraction of the repeat units of Formula (I) in the cationic polymer, with random or block repeat unit distribution;
each $R^4$ is independently a cationic group of the Formula (V) or Formula (VI)

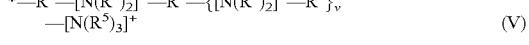

(V)

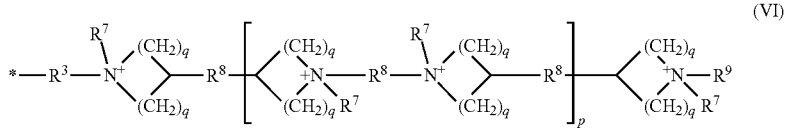

(VI)

$R^3$ is an alkylene having at least four carbon atoms;
each $R^1$ is independently alkyl;
each $R^6$ is independently alkylene;
v is an integer in a range of 0 to 10;
each $R^7$ is an alkyl;
each R is an alkylene;
each R is an alkyl;
each q is independently an integer in a range of 1 to 2; and
p is an integer in a range of 0 to 10;
the variable z represents the overall mole fraction of the repeat units of Formula (IV) in the cationic polymer, with random or block monomer repeat unit distribution, wherein z is in a range of 0.15 to about 0.35; and
the cationic group has corresponding anionic counter ions.

The above summary is not intended to describe each embodiment. The details of one or more embodiments of the invention are also set forth in the description below. Other features, objects, and advantages will be apparent from the description and from the claims.

DESCRIPTION

As used herein, the term "a", "an", and "the" are used interchangeably and mean one or more.

As used herein, the term "and/or" is used to indicate one or both stated cases may occur, for example A and/or B includes, (A and B) and (A or B). Thus, the term can be used to mean A alone, B alone, or both A and B.

As used herein, the term "ion exchange membrane" refers to a membrane comprising ion containing polymers (also known as ion exchange resins), in which the ion containing polymers are typically almost exclusively either polycations or polyanions. The counterions of the polymers' charged functional groups are typically small, water soluble ions, which can migrate through the membrane polymer matrix, particularly under the influence of an electric field or a concentration gradient.

As used herein, the term "polymer" refers to a macro-structure having a number average molecular weight (Mn) of at least 5,000 Daltons, at least 10,000 Daltons, at least 25,000 Daltons, at least 50,000 Daltons, at least 100,000 Daltons, at least 300,000 Daltons, at least 500,000 Daltons, at least 750,000 Daltons, at least 1,000,000 Daltons, or even at least 1,500,000 Daltons.

As used herein, the term "polymer backbone" refers to the main continuous chain of the polymer. The term polymer can refer to a block or random copolymer and a homopolymer, copolymer, terpolymer, or the like.

As used herein, an asterisk (*) in a formula for a group denotes the point of attachment of the group to a polymeric backbone.

As used herein, the symbol "⌇⌇⌇" is used to indicate the point of attachment of a repeat unit within a polymeric material to another group within the polymeric material such as another repeat unit or to a terminal group.

As used herein, the term "alkyl" broadly refers to substituted or unsubstituted monovalent linear chain and branched alkyl groups, as well as cyclic alkyl groups, having from 1 to 40 carbon atoms, 1 to 30 carbon atoms, 1 to 12 carbons or, in some embodiments, from 8 to 30 carbon atoms, 12 to 20 carbon atoms, 16 to 30 carbon atoms, 1 to 8 carbon atoms, or 1 to 4 carbon atoms. Such alkyl groups may be substituted or unsubstituted. Examples of linear chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include those with from 1 to 8 carbon atoms such as isopropyl, iso-butyl, sec-butyl, t-butyl, neopentyl, isopentyl, and 2,2-dimethylpropyl groups. As used herein, the term "alkyl" encompasses n-alkyl, and isoalkyl groups as well as other branched chain forms of alkyl. Examples of cycloalkyl groups include those with from 3 to 8 carbon atoms such as cyclopropyl, cyclobutyl, cyclopentyl, and cyclohexyl.

As used herein, the term "alkylene" broadly refers to substituted or unsubstituted divalent linear chain, branched, and cyclic alkylene groups having from 1 to 40 carbon atoms ($C_1$-$C_{40}$), 1 to about 20 carbon atoms ($C_1$-$C_{20}$), 1 to 12 carbon atoms ($C_1$-$C_{12}$), 1 to 8 carbon atoms ($C_1$-$C_8$), 1 to 6 carbon atoms ($C_1$-$C_6$) or, in some examples, from 6 to 12 carbon atoms ($C_1$-$C_{12}$), 6 to 10 carbon atoms ($C_6$-$C_{10}$), 8 to 12 carbon atoms ($C_8$-$C_{12}$), 8 to 10 carbon atoms ($C_8$-$C_{10}$), 4 to 9 carbon atoms ($C_4$-$C_9$), 6 to 9 carbon atoms ($C_6$-$C_9$), and 6 to 8 carbon atoms ($C_6$-$C_8$). Examples of linear chain divalent alkylene groups include those having from 1 to 8 carbon atoms such as ethyl (—$CH_2cH$—), n-propyl (—$CH_2CH_2CH_2$—), n-butyl (—$CH_2CH_2CH_2CH_2$—), n-pentyl (—$CH_2CH_2CH_2CH_2CH_2$—), n-hexyl (—$CH_2CH_2CH_2CH_2CH_2CH_2$—), n-heptyl (—$CH_2CH_2CH_2CH_2CH_2CH_2CH_2$—), and n-octyl (—$CH_2CH_2CH_2CH_2CH_2CH_2CH_2CH_2$—) groups.

As used herein, the term "aryl" refers to substituted or unsubstituted cyclic aromatic hydrocarbons that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some examples, aryl groups contain about 6 to about 14 carbon atoms ($C_6$-$C_4$) or from 6 to 10 carbon atoms ($C_6$-$C_{10}$) in the ring portions of the groups. Aryl groups can be unsubstituted or substituted, as defined herein.

As used herein, the term "aralkyl" refers to an alkyl substituted with an aryl group. An aralkyl can be considered as an alkylene bonded to an aryl group. The alkylene can have 1 to 10 carbon atoms (e.g., at least 1, at least 2, at least 3, or at least 4, and up to 8, up to 6, or up to 4 carbon atoms) and the aryl group can have 6 to 10 carbon atoms (e.g., at least 6, at least 8, and up to 10 or up to 8). In some embodiments, the alkylene has 1 to 10 carbon atoms (e.g, 1 to 6 carbon atoms or 1 to 4 carbon atoms) and the aryl is phenyl.

As used herein, the term "substituted" broadly refers to a group (e.g., an alkyl group or an aryl group) in which at least one hydrogen atom contained therein is replaced by at least one "substituent." Examples of substituents include, but are not limited to: alkyl, halogen (e.g., F, Cl, Br, and I), and various oxygen-containing groups such as hydroxyl groups, alkoxy groups, and aryloxy groups (the oxygen atom is typically the atom connected to the group that is substituted). One example is an aryl substituted by an alkyl, alkoxy, or halo.

As used herein, the terms "halo" or "halogen" or "halide," by themselves or as part of another substituent, mean, unless otherwise stated, a fluorine, chlorine, bromine, or iodine atom or ion.

As used herein, the term "leaving group" broadly refers to a group that can be displaced and replaced by a nucleophilic atom, such as a nitrogen atom. Examples of leaving groups include halogens, such as chlorine, bromine, and iodine, which are displaced as chloride, bromide, and iodide; and sulfonyl esters, such as mesyl, tosyl, and nosyl, which are displaced as mesylate, tosylate, and nosylate. While the leaving group can be any suitable leaving group, the leaving group can be bromine.

As used herein, the term "anionic counter ion" broadly refers to anions such as chloride, bromide, iodide, acetate, sulfate, carbonate, or bicarbonate. Anionic counter ion also includes mesylate, tosylate, nosylate, hydroxide, and alkoxide.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The term "about" as used herein can allow for a degree of variability in a value or range, for example, within 10%, within 5%, or within 1% of a stated value or of a stated limit of a range.

The present disclosure relates to cationic polymers having a plurality of quaternary amino groups, that can be used to make solid, polymeric membranes, including membranes that can be used as polymeric anion exchange membranes. These membranes can have a charge density up to 5 milliequivalent per gram of cationic polymer (e.g., in a range of 1 to 5 milliequivalent per gram of cationic polymer). The cationic polymers can be made by a method comprising:

obtaining or providing a precursor polymer comprising x repeat units of Formula (I) and y repeat units of Formula (II)

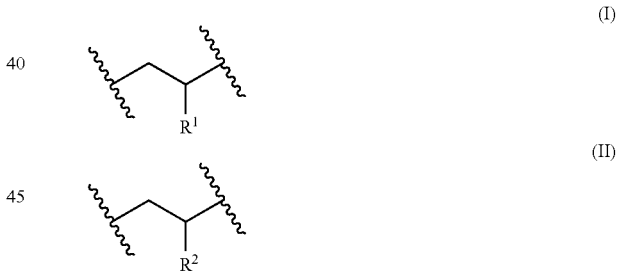

wherein
each $R^1$ is independently an aralkyl or substituted aralkyl;
each $R^2$ is independently pendant *—$R^3$-L groups,
$R^3$ is alkylene having at least four carbon atoms;
L is a leaving group;
the asterisk (*) represents the point of attachment of $R^3$ to the polymer backbone;
the variable x represents an overall mole fraction of the repeat units of Formula (I) in the precursor polymer, with random or block repeat unit distribution;
the variable y represents an overall mole fraction of the repeat units of Formula (I) in the precursor polymer, with random or block monomer repeat unit distribution, wherein y is in a range of about 0.15 to about 0.35 (e.g., about 0.15 to about 0.25, about 0.20 to about 0.35, about 0.25 to about 0.35);
reacting the pendant *—$R^3$-L groups of the precursor polymer with a cationic amine compound having at least one tertiary amino group and at least one quaternary amino group to form the cationic polymer having the plurality of pendant quaternary amino groups, wherein the cationic polymer having the plurality of pendant quaternary amino groups comprises a repeat units of Formula (I) and z repeat units of Formula (IV)

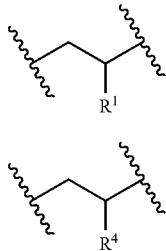

wherein
each $R^4$ is independently a cationic group of the Formula (V) or Formula (VI)

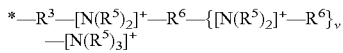

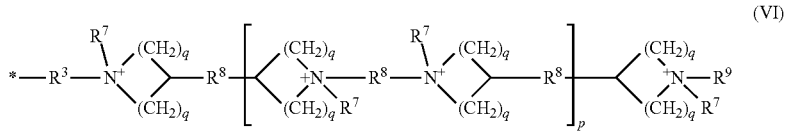

each $R^5$ is independently alkyl (e.g., an alkyl having 1 to 10 carbon atoms. 1 to 6 carbon atoms, or 1 to 4 carbon atoms);
each R is independently alkylene (e.g., an alkylene having at least 6 carbon atoms and up to 12 carbon atoms);
v is an integer in a range of 0 to 10 (e.g., 1, 1 to 2, 1 to 3, 2 to 3, 2 to 5, 3 to 8, and 6 to 8); each $R^7$ is an alkyl (e.g., an alkyl having 1 to 10 carbon atoms, 1 to 6 carbon atoms, or 1 to 4 carbon atoms);
each $R^9$ is an alkylene;
each $R^9$ is an alkyl;
each q is independently an integer in a range of 1 to 2;
p is an integer in a range of 0 to 10 (e.g., 1 to 10, 0 to 6, 1 to 6, 0 to 4, 1 to 4, 0 to 3, 1 to 3, or 0 to 2);
the variable z represents the overall mole fraction of the repeat units of Formula (IV) in the cationic polymer, with random or block monomer repeat unit distribution, wherein z is in a range of 0.15 to about 0.35 (e.g., at least 0.15, at least 0.20, or at least 0.25 and up to 0.30, up to 0.25 or up to 0.20 such as about 0.15 to about 0.25, about 0.20 to about 0.35, or about 0.25 to about 0.35); and
the cationic group has corresponding anionic counter ions.
$R^1$ is an aralkyl. The aryl portion is often phenyl and the alkylene portion often has 2 to 6 carbon atoms, 2 to 4 carbon atoms, or 2 carbon atoms. The aryl portion can optionally be substituted with substituents such as, for example, an alkyl (e.g., an alkyl having 1 to 6 or 1 to 4 carbon atoms), alkoxy (e.g., an alkoxy having 1 to 6 or 1 to 4 carbon atoms), or halogen (e.g., fluorine, bromide, chlorine, or iodine).

L is a leaving group and is often a halogen.

Each $R^3$ is an alkylene having at least four carbon atoms. In some embodiments, each R can be independently ($C_6$-$C_{12}$)alkylene, such as ($C_6$-$C_{10}$)alkylene, ($C_8$-$C_{12}$)alkylene, and ($C_8$-$C_{10}$)alkylene. For example, each $R^3$ can be independently —($CH_2$)$_n$—, wherein n is an integer from 6 to 12, such as an integer from 6 to 10, 8 to 12, and 8 to 10.

Each R can be independently alkylene such as ($C_4$—C) alkylene, such as ($C_6$—C)alkylene, and ($C_6$-$C_5$)alkylene. For example, each $R^6$ can be independently —($CH_2$)$_m$—, wherein M is an integer from 4 to 9, such as an integer from 4 to 8, 6 to 9, and 6 to 8.

The cationic amine compound that is reacted with the precursor polymer can be of Formula (VII):

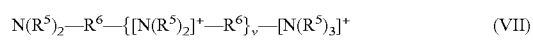

wherein
each $R^1$ is independently alkyl;
each $R^6$ is independently alkylene such as one having 4 to 9 carbon atoms;
v is an integer in a range of 0 to 10 (e.g., 1, 1 to 2, 1 to 3, 2 to 3, 2 to 5, 3 to 8, and 6 to 8); and
the cationic groups have corresponding anionic counter ions.

Examples of cationic amines of the Formula (VII) include cationic amines of the formula $N(CH_3)_2$—$(CH_2)_m$—$\{[N(CH_3)_2]^+$—$(CH_2)_m\}_v$—$[N(CH_3)_3]^+$ where $R_5$ is methyl. Examples include cationic amines of the formula $N(CH_3)_2$—$(CH_2)_m$—$\{[N(CH_3)_2]^+$—$(CH_2)_m\}_{6-8}$—$[N(CH_3)_3]^+$, $N(CH_3)_2$—$(CH_2)_{6-8}$—$\{[N(CH_3)_2]^+$—$(CH_2)_{6-8}\}_v$—$[N(CH_3)_3]^+$, and $N(CH_3)_2$—$(CH_2)_6$—$\{[N(CH_3)_2]^+$—$(CH_2)_{6-8}\}_{3-8}$—$[N(CH_3)_3]^+$. The variable m is in a range of 4 to 9, 4 to 8, or 6 to 8 and v is in a range of 0 to 10, 0 to 8, or 3 to 8.

And, in turn, the group $R^4$ can be *—$R^3$—$N^+(CH_3)_2$—$(CH_2)_m$—$\{[N(CH_3)_2]^+$—$(CH_2)_m\}_v$—$[N(CH_3)_3]^+$, such as *—$R^3$—N—$(CH_3)_2$—$(CH_2)_m$—$\{[N(CH_3)_2]^+$—$(CH_2)_m\}_{3-8}$—$[N(CH_3)_3]^+$, *—$R^3$—$N^t(CH_3)_2$—$(CH_2)_{6-8}$—$\{[N(CH_3)_2]^+$—$(CH_2)_{6-8}\}_v$—$[N(CH_3)_3]^+$, and *—$R^3$—$N^+(CH_3)_2$—$(CH_2)_{6-8}$—$\{[N(CH_3)_2]^+$—$(CH_2)_{6-8}\}_{3-8}$—$[N(CH_3)_3]^+$. Examples of $R^4$ groups include groups of the formula *—$(CH_2)_{6-10}$—$N^+(CH_3)_2$—$(CH_3)_m$—$\{[N(CH_3)_2]^+$—$(CH_2)_m\}_v$—$[N(CH_3)_3]^+$, such as *—$(CH_2)_{6-10}$—$N^+(CH_3)_2$—$(CH_2)_m$—$\{[N(CH_3)_2]^+$—$(CH_2)_m\}_{3-8}$—$[N(CH_3)_3]^+$, *—$(CH_2)_{6-10}$—N—$(CH_3)_2$—$(CH_2)_{6-8}$—$\{[N(CH_3)_2]^+$—$(CH_2)_{6-8}\}_v$—$[N(CH_3)_3]^+$—, and *—$(CH_2)_{6-8}$—$N^+(CH_3)_2$—$(CH_2)_{6-8}$—$\{[N(CH_3)_2]^+$—$(CH_2)_{6-8}\}_{3-8}$—$[N(CH_3)_3]$. The variable m is in a range of 4 to 9, 4 to 8, or 6 to 8 and v is in a range of 0 to 10, 0 to 8, or 3 to 8.

$R^4$ can be a cationic group of the Formula (VI).

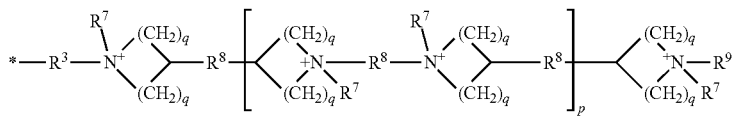

Examples of groups of Formula (VI) include groups of the formula:

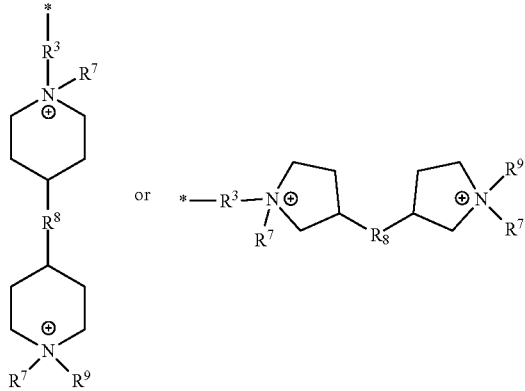

the cationic group having corresponding anionic counter ions.

The cationic amine compound can be synthesized by any suitable method including a method comprising:

(a) reacting a cationic amine compound having at least one tertiary amino group and at least one quaternary amino group with a compound of the Formula (VIII):

$$L-R^6-L \qquad (VIII)$$

to form a product of the Formula (IX):

(b) reacting the product of the Formula (IX) with a diamine compound of the Formula (X):

$$N(R^5)_2-R^6-N(R^5)_2 \qquad (X)$$

to give a compound of the Formula (VII)

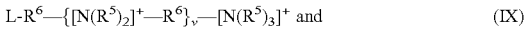

Examples of compounds of the Formula (VIII) include compound of the formula L-(CH$_2$)$_m$-L, such as L-(CH$_2$)$_{6-8}$-L. Examples of the product of the Formula (IX) include compounds of the formula L-(CH$_2$)$_m${[N(CH$_3$)$_2$]$^+$—(CH$_2$)$_m$}$_{3-8}$—[N(CH$_3$)$_3$], L-(CH$_2$)$_{6-8}$—{[N(CH$_3$)$_2$]$^+$—(CH$_2$)$_{6-8}$}$_v$—[N(CH$_3$)$_3$]$^+$, and L-(CH$_2$)$_{6-8}$—{[N(CH$_3$)$_2$]$^+$—(CH$_2$)$_{6-8}$}$_{3-8}$—[N(CH$_3$)$_3$]$^+$. Examples of diamine compounds of the Formula (X) include compounds of the formula N(CH$_3$)$_2$—(CH$_2$)$_m$—N(CH$_3$)$_2$, such as N(CH$_3$)$_2$—(CH$_2$)$_{6-8}$—N(CH$_3$)$_3$. The leaving group L can be bromide, chloride or iodide.

The instant disclosure also relates to a cationic polymer comprising x repeat units of Formula (I) and z repeat units of Formula (IV)

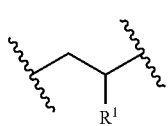

(I)

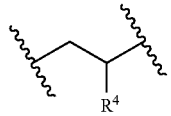

(IV)

wherein each $R^1$ is independently an aralkyl or substituted aralkyl;
the variable x represents an overall mole fraction of the repeat units of Formula (I) in the cationic polymer, with random or block repeat unit distribution;
each R is independently a cationic group of the Formula (V) or Formula (VI)

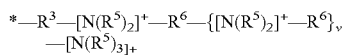

(V)

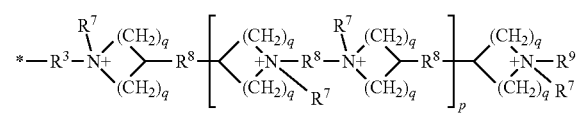

(VI)

each $R^5$ is independently alkyl;
each R is independently alkylene;
v is an integer in a range of 0 to 10 (e.g., 1, 1 to 2, 1 to 3, 2 to 3, 2 to 5, 3 to 8, and 6 to 8);
each $R^7$ is an alkyl;
each $R^8$ is an alkylene;
each $R^9$ is an alkyl;
each q is independently an integer in a range of 1 to 2; and
p is an integer in a range of 0 to 10; and
the variable z represents the overall mole fraction of the repeat units of Formula (IV) in the cationic polymer, with random or block monomer repeat unit distribution, wherein z is in a range of 0.15 to about 0.35 (e.g., at least 0.15, at least 0.20, or at least 0.25 and up to 0.30, up to 0.25 or up to 0.20 such as about 0.15 to about 0.25, about 020 to about 0.35, or about 0.25 to about 0.35); and
the cationic group has corresponding anionic counter ions.

$R^1$ is an aralkyl. The aryl portion is often phenyl and the alkylene portion often has 2 to 6 carbon atoms, 2 to 4 carbon atoms, or 2 carbon atoms. The aryl portion can optionally be substituted with substituents such as, for example, an alkyl (e.g., an alkyl having 1 to 6 or 1 to 4 carbon atoms), alkoxy (e.g., an alkoxy having 1 to 6 or 1 to 4 carbon atoms), or halogen (e.g., fluorine, bromide, chlorine, or iodine).

Each R can be independently have at least four carbon atoms such as a (C$_6$-C$_{12}$)alkylene, such as (C$_6$-C$_{10}$)alkylene, (C$_8$-C$_{12}$)alkylene, and (C$_8$-C$_{10}$)alkylene. For example, each $R^3$ can be independently —(CH$_2$)—, wherein n is an integer from 6 to 12, such as an integer from 6 to 10, 8 to 12, and 8 to 10.

Each $R^6$ can be independently (C$_4$-C$_9$)alkylene, such as (C$_6$-C$_9$)alkylene, and (C$_6$-C$_8$)alkylene. For example, each $R^6$ can be independently —$(CH_2)_m$—, wherein m is an integer from 4 to 9, such as an integer from 4 to 8, 6 to 9, and 6 to 8.

$R^4$ can be *—$R^3$—$N^+(CH_3)_2$—$(CH_2)_m$—{[$N(CH_3)_2$]$^+$—$(CH_2)_m$}$_v$—[$N(CH_3)_3$]$^+$, such as *—$R^3$—$N^+(CH_3)_2$—$(CH_2)_m$—{[$N(CH_3)_2$]$^+$—$(CH_2)_m$}$_{3-8}$—[$N(CH_3)_3$]$^+$, *—$R^3$—$N(CH_3)_2$—$(CH_2)_{6-8}${$N(CH_3)_2^+$—$(CH_2)_{6-8}$}$_v$—[$N(CH_3)_3$]$^+$, and *—$R^3$—N—$(CH_3)_2$—$(CH_2)_{6-8}$—{[$N(CH_3)_2$]$^+$—$(CH_2)_{6-8}$}$_{3-8}$—[$N(CH_3)_3$]$^+$. Examples of $R^4$ groups include groups of the formula *—$(CH_2)_{6-10}$—$N^+(CH_3)_2$—$(CH_2)_m$—{[$N(CH_3)_2$]$^+$—$(CH_2)_m$}$_v$—[$N(CH_3)_3$]$^+$, such as *—$(CH_2)_{6-10}$—$N^+(CH_3)_2$—$(CH_2)_m$—{[$N(CH_3)_2$]$^+$—$(CH_2)_m$}$_{3-8}$—[$N(CH_3)_3$]$^+$, *—$(CH_2)_{6-10}$—$N^+(CH_3)_2$—$(CH_2)_{6-8}$—{[$N(CH_3)_2$]$^+$—$(CH_2)_{6-8}$}$_v$—[$N(CH_3)_3$]$^+$, and *—$(CH_2)_{6-10}$—$N^+(CH_3)_2$—$(CH_2)_{6-8}$—{[$N(CH_3)_2$]$^+$—$(CH_2)_{6-8}$}$_{3-8}$-[$N(CH_3)_3$]$^+$.

Examples of groups of Formula (VI) include groups of the formula:

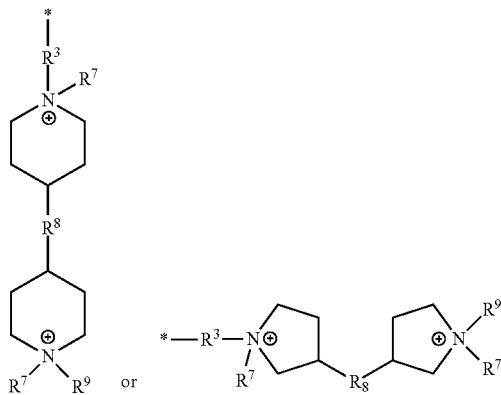

the cationic group having corresponding anionic counter ions.

In any of the cationic polymers described herein, z+x can equal to at least about 0.90 (e.g., at least about 0.93, at least about 0.95, at least about 0.97, at least about 0.99 or about 1; about 0.90 to about 0.95, about 0.93 to about 0.99 or about 0.95 to about 1).

In any of the cationic polymers described herein, $R^1$ can be independently an aralkyl or a substituted aralkyl (with the substitution on the aryl portion of the aralkyl) and each $R^4$ is independently a cationic group of the formula:

*—$R^3$—$N^+(CH_3)_2$—$(CH_2)_m$—{[$N(CH_3)_2$]$^+$
   —$(CH_2)_m$}$_{3-8}$—[$N(CH_3)_3$]$^+$,

*—$R^3$—$N^+(CH_3)_2$—$(CH_2)_{6-8}$—{[$N(CH_3)_2$]$^+$
   —$(CH_2)_{6-8}$}$_v$—[$N(CH_3)_3$]$^+$ or

*—$R^3$—$N^+(CH_3)_2$—$(CH_2)_{6-8}${[$N(CH_3)_2$]$^+$
   —$(CH_2)_{6-8}$}$_{3-8}$—[$N(CH_3)_3$]$^+$; and the cationic group has corresponding anionic counter ions. For example, $R^1$ can be an aralkyl or an aralkyl substituted with a halogen, alkyl, or alkoxy. $R^4$ can independently be a cationic group of the formula:

*—$(CH_2)_{6-10}$—$N^+(CH_3)_2$—$(CH_2)_m$—{[$N(CH_3)_2$]$^+$—
   $(CH_2)_m$}$_{3-8}$—[$N(CH_3)_3$]$^+$,

*—$(CH_2)_{6-10}$—$N^+(CH_3)_2$—$(CH_2)_{6-8}$
   —{[$N(CH_3)_2$]$^+$—$(CH_2)_{6-10}$}$_v$—[$N(CH)_3^+$]$^+$, or

*—$(CH_2)_{6-10}$—$N^+(CH_3)_2$—$(CH_2)_{6-10}$
   —{[$N(CH_3)_2$]$^+$—$(CH_2)_{6-10}$}$_{3-8}$—[$N(CH_3)_3$]$^+$.

The cationic group has corresponding anionic counter ions. The counterions can be, for example, chloride, bromide, iodide, bicarbonate, carbonate, hydroxide, alkoxide, acetate, sulfate, and the like.

As mentioned herein, the present disclosure relates to cationic polymers having a plurality of quaternary amino groups, that can be used to make membranes (e.g., solid, polymeric membranes), including membranes that can be used as polymeric anion exchange membranes. These membranes can have a charge density of at least about 1 milliequivalent per gram of cationic polymer (e.g., 1, 2, 3, 4, 5 or more milliequivalents per gram of cationic polymer) and/or up to about 5 milliequivalent per gram of cationic polymer (e.g., about 1 to about 5, about 2 to about 5, about 3 to about 5, about 2 to about 4 or about 1 to about 3 milliequivalent per gram of cationic polymer).

Polymeric ion exchange membranes of the present disclosure are, in some examples, solid, meaning that it does not readily flow when poured, for example, they have a viscosity at ambient conditions of greater than $10^{10}$, $10^{11}$, $10^{12}$, or even $10^{13}$ Pascal seconds.

In one embodiment, the polymeric ion exchange membranes of the present disclosure are dense, meaning they form a continuous, nonporous film or layer.

In another embodiment, the polymeric ion exchange membranes of the present disclosure are porous, meaning the membranes contain open passages passing from one major surface of the membrane to the opposite major surface and these passages are at least large enough to allow some solvated ions to pass through. Examples include membranes classified as ultrafiltration membranes, nanofiltration membranes, microfiltration membranes, etc. These membranes typically have a nominal pore diameter of at least 0.02 micrometers.

As discussed herein, the cationic groups represented by the group $R^4$ can be present as pendant groups off the polymer backbone. The polymeric ion exchange membranes of the present disclosure comprise at least one cationic group, but, in some examples comprises an equivalent weight (grains of polymer per mole of ionic group) of 1000 or less, 500 or less, 350 or less, 250 or less or even 200 or less.

The polymeric ion exchange membranes of the present disclosure comprise at least one cationic group, but, in some examples comprises an equivalent weight of about 1 milliequivalents per gram of cationic polymer (e.g., dry membrane), about 2 milliequivalents per gram of cationic polymer, about 3 milliequivalents per gram of cationic polymer, about 4 milliequivalents per gram of cationic polymer or about 5 milliequivalents per gram of cationic polymer.

The polymeric ion exchange membranes of the present disclosure may be made using techniques known in the art, for example, by casting a liquid composition comprising the polymer, and drying and optionally annealing to form a membrane; or by extrusion of the molten polymer. In one embodiment, the polymeric ion exchange membranes of the present disclosure comprise a reinforcement material, such as a porous support (e.g., a woven or nonwoven material made of a suitable material, such as a fluoropolymer, including expanded polytetrafluoroethylene, porous polyethylene or polypropylene, electrospun nanofibers, fiberglass, polymer fibers, fiber mats, perforated films, and porous ceramics), which is imbibed (e.g., saturated or coated) with a liquid composition comprising a cationic polymer described herein either neat or containing solvent (e.g., dissolved in a suitable solvent), followed by removal of the solvent (if present) to embed the polymer into the pores of the reinforcement material. The porous support can be electrically non-conductive.

In one embodiment, the polymeric ion exchange membranes of the present disclosure have a thickness of less than 100 micrometers, less than 50 micrometers, or even less than 25 micrometers, and greater than 100 nanometers. In one embodiment, the distance between the anode and the cathode is less than 100 micrometers, less than 50 micrometers, or even less than 25 micrometers, and greater than 100 nanometers.

The polymeric ion exchange membranes of the present disclosure can have a swelling ratio. The swelling ratio can be characterized by the linear expansion ratio either in the chloride form or in the hydroxide form, which can be determined using the difference between wet and dry dimensions of a membrane sample (e.g., a sample measuring 3 cm in length and 1 cm in width) using equation (1):

$$SW(\%) = \frac{X_{wet} - X_{dry}}{X_{dry}} \times 100\% \qquad (1)$$

where $X_{wet}$ and $X_{dry}$ are the lengths of a wet and a dry membrane, respectively.

The swelling ratio in the chloride form can be less than about 60%, less than about 50%, less than about 40%, less than about 30%, less than about 20%, less than about 10% or less than about 5%. For example, the swelling ratio can be, on the upper end, about 60%, about 55%, about 50%, about 45%, about 40%, about 35% or about 30% and, on the lower end, about 25%, about 20%, about 15%, about 10%, about 5% or about 1%.

The swelling ratio in the hydroxide form can be less than about 90%, less than about 85%, less than about 80%, less than about 75%, less than about 70%, less than about 65%, less than about 60%, less than about 55%, less than about 50%, less than about 45%, less than about 40%, less than about 35% or less than about 30%. For example, the swelling ratio can be, on the upper end, about 90%, about 80%, about 70%, about 60% or about 50% and, on the lower end, about 45%, about 40%, about 35%, about 30%, about 25% or about 20%.

The polymeric ion exchange membranes of the present disclosure can be placed between two electrodes, the anode and cathode, of an electrochemical device. In some embodiments, the electrode is a gas diffusion electrode comprising a gas diffusion layer coated with a catalyst. Gas diffusion layers are known in the art and include for example carbon paper or cloth, or a metal mesh.

Examples of electrochemical devices include, but are not limited to, solid-state fuel cells, electrolyzers, chlor-alkali cells, solid polymer electrolyte batteries, redox flow batteries or electrochemical desalination devices.

Electrode materials can include, for example, graphitic carbon, glassy carbon, titanium, or any of the following "catalytically active elements": V, Cr, Mn, Fe, Co, Ni, Cu, Sn, Zr, Nb, Mo, Ru, Rh, Pd, Ag, Cd, Hf, Ta, W, Re, Ir, Pt, Au. Hg, Al, Si, In, Tl, Pb, Bi, Sb, Te, U, Sm, Tb, La, Ce, Nd, and alloys or combinations thereof.

In one embodiment, the electrochemical device comprises catalytically active nanoparticles. The nanoparticles may be supported on carbon particles or nanostructured supports, such as carbon nanotubes or nanostructured thin films (NSTF) as disclosed in, e.g., U.S. Pat. No. 8,748,330 (Debe et al.).

In one embodiment, the electrochemical device comprises an extended surface area catalyst based electrode such as a nanostructured thin film electrode, nanotube electrode, porous sponge electrode, or two-dimensional polycrystalline film electrode.

In one embodiment, the cathode of the electrochemical device comprises a metal selected from silver, gold, copper, or combinations thereof.

In one embodiment, the anode of the electrochemical device comprises a metal selected from ruthenium, iridium, platinum, titanium, or combinations thereof. In one embodiment, the electrochemical device is substantially free of platinum, meaning the electrode comprises less than 0.1%, less than 0.01% or even less than 0.001% by weight of platinum.

The cathode, the anode, and/or polymeric ion exchange membranes of the present disclosure can be assembled each as a separate component or can be fabricated wherein the polymeric ion exchange membrane (or a portion thereof) is fabricated with one or both electrodes or a portion thereof. For example, to maximize cost savings and in some instances performance, the individual components, or layers thereof, may be sufficiently thin, such that some of the components could act as a support during the fabrication of a thin layer. The various components or portions thereof can be laminated together, formed in situ on a surface of a component, and/or coated onto a component.

The membrane electrode assembly comprising the anode, cathode and polymeric ion exchange membranes of the present disclosure can be sandwiched between two flow field plates and then held together such that each layer is in contact, preferably intimate contact with the adjacent layers.

Embodiments of the present disclosure include a method for producing electricity with an electrochemical device comprising an anode, cathode and polymeric ion exchange membranes of the present disclosure, the method comprising: contacting a composition comprising hydrogen gas at the anode; contacting oxygen gas at the cathode; and producing electricity. The method can be accomplished with a system for producing electricity comprising an electrochemical device comprising an anode, cathode and polymeric ion exchange membranes of the present disclosure, a hydrogen gas input, wherein the hydrogen gas input is configured to provide a composition comprising hydrogen gas to an anode flow field for oxidation of the hydrogen gas at the anode electrode; and an oxygen gas input, wherein the oxygen gas input is configured to provide a composition comprising oxygen gas to a cathode flow field for reduction of the oxygen gas at the cathode electrode.

Embodiments of the present disclosure also include a method for electrochemically reducing carbon dioxide with an electrochemical device comprising an anode, cathode and polymeric ion exchange membranes of the present disclosure, the method comprising: introducing a composition comprising carbon dioxide to the cathode; and applying electrical energy to the electrochemical device to effect electrochemical reduction of the carbon dioxide. The method can be accomplished with a system for reducing carbon dioxide comprising: an electrochemical device comprising an anode, cathode and polymeric ion exchange membranes of the present disclosure; and a carbon dioxide input, wherein the carbon dioxide input is configured to provide a composition comprising carbon dioxide to a cathode flow field for reduction of the carbon dioxide at the cathode electrode.

As used herein the carbon dioxide input is a composition comprising, in one embodiment carbon dioxide in its pure form. In one embodiment, the composition comprising the carbon dioxide may be humidified, comprising at most 100% relative humidity and at least 1% relative humidity. Generally, the presence of water with the carbon dioxide input will generate hydrated forms of carbon dioxide including carbonate and bicarbonate. Alternatively, in one embodiment, the composition comprising the carbon dioxide may not be humidified.

A potential difference is applied across the electrochemical cell to electrochemically reduce the composition comprising the carbon dioxide. For the reduction of carbon dioxide, the cell is operated at a potential difference equal to or more positive than about 1.33V, with the highest potential difference being 4.0V, such as within about 2.6 to about 3.4V.

The reaction products generated by the electrochemical reduction of the carbon dioxide, in addition to CO, hydrogen ($H_2$), and water, may include other reduced products, such as $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$ or $(COO^-)_2$. By varying the reactants and/or reaction parameters, such as the catalyst material, the anionic membrane material, solvent (if any,) and reduction potential, the reaction products observed and their ratios can be adjusted. For example, in one embodiment, the rate of generating reaction products can be adjusted based on the availability of electrical energy from a carbon-neutral energy source. In one embodiment, a syngas may be generated. A syngas is a mixture comprising carbon monoxide (CO) and hydrogen ($H_2$) and sometimes carbon dioxide, which can be used as a feedstock for synthesizing more complex carbon-based materials. Carbon monoxide selectivity of a reaction can be quantified by measuring the amount of carbon monoxide present in the reaction product versus the total amount of reaction products (e.g., hydrogen gas and carbon monoxide). In one embodiment, the electrochemical device of the present disclosure has a carbon monoxide selectivity of greater than 1, 2, 3, 4, 5, 10, 25, 30, 40 or even 50% and no more than 100%.

Embodiments of the present disclosure also include method for electrochemically reducing water with an electrochemical device comprising an anode, cathode and polymeric ion exchange membranes of the present disclosure, the method comprising: introducing a composition comprising water (e.g., liquid or gaseous water) to the cathode; and applying electrical energy to the electrochemical device to effect electrochemical reduction of the water. The method can be accomplished with a system for reducing water comprising: an electrochemical device comprising an anode, cathode and polymeric ion exchange membranes of the present disclosure; and a water input, wherein the water input is configured to provide a composition comprising water to a cathode flow field for reduction of the water at the cathode electrode.

Illustrative embodiments of the present disclosure are as follows:

Embodiment 1 relates to a method for preparing a cationic polymer having a plurality of quaternary amino groups, the method comprising:

obtaining or providing a precursor polymer comprising x repeat units of Formula (I) and y repeat units of Formula (II)

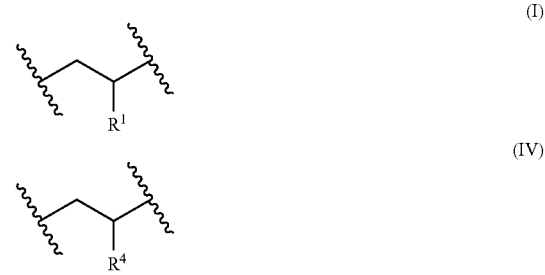

wherein each $R^1$ is independently an aralkyl or a substituted aralkyl;

each $R^2$ is independently pendant *—$R^3$-L groups, $R^3$ is alkylene having at least four carbon atoms;

L is a leaving group;

the asterisk (*) represents the point of attachment of $R^3$ to the polymer backbone;

the variable x represents an overall mole fraction of the repeat units of Formula (I) in the precursor polymer, with random or block repeat unit distribution;

the variable y represents an overall mole fraction of the repeat units of Formula (II) in the precursor polymer, with random or block monomer repeat unit distribution, wherein y is in a range of about 0.15 to about 0.35;

reacting the pendant *—$R^3$-L groups of the precursor polymer with a cationic amine compound having at least one tertiary amino group and at least one quaternary amino group to form the cationic polymer having the plurality of pendant quaternary amino groups, wherein the cationic polymer having the plurality of pendant quaternary amino groups comprises x repeat units of Formula (I) and z repeat units of Formula (IV)

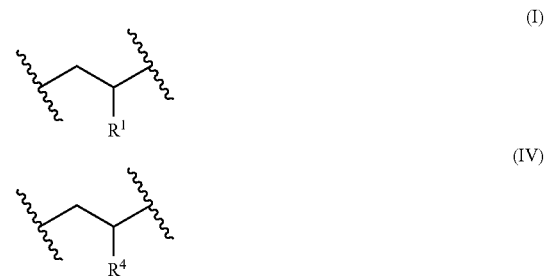

wherein each R is independently a cationic group of the Formula (V) or Formula (VI)

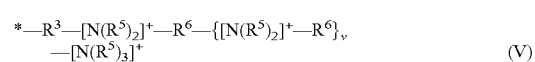

*—$R^3$—$[N(R^5)_2]^+$—$R^6$—{$[N(R^5)_2]^+$—$R^6$}$_y$
—$[N(R^5)_3]^+$ (V)

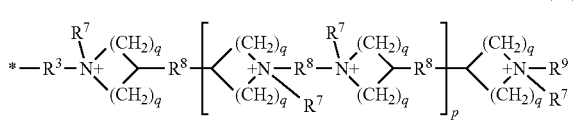

each R is independently alkyl;
each $R^6$ is independently alkylene;
v is an integer in a range of 0 to 10;
each $R^7$ is an alkyl;
each $R^8$ is an alkylene;
each $R^9$ is an alkyl;
each q is independently an integer in a range of 1 to 2; and
p is an integer in a range of 0 to 10; and
the variable z represents the overall mole fraction of the repeat units of Formula (IV) in the cationic polymer, with random or block monomer repeat unit distribution, wherein z is in a range of 0.15 to about 0.35; and
the cationic group has corresponding anionic counter ions.

Embodiment 2 relates to the method of Embodiment 1, wherein each $R^3$ is independently $(C_6$-$C_{12})$alkylene.

Embodiment 3 relates to the method of Embodiments 1 or 2, wherein each $R^3$ is independently —$(CH_2)_n$—, wherein n is an integer from 6 to 12.

Embodiment 4 relates to the method of any one of Embodiments 1 to 3, wherein each $R^6$ is independently $(C_4$-$C_9)$alkylene.

Embodiment 5 relates to the method of any one of Embodiments 1 to 4, wherein each $R^6$ is independently —$(CH_2)_m$—, wherein m is an integer from 4 to 9.

Embodiment 6 relates to the method of any one of Embodiments 1 to 5, wherein each $R^1$ is an aralkyl or an aralkyl substituted with a halogen, alkyl, or alkoxy.

Embodiment 7 relates to the method of any one of Embodiments 1 to 5, wherein the cationic amine compound that is reacted with the precursor polymer is of Formula (VII)

$$N(R^5)_2\text{—}R^6\text{—}\{[N(R^5)_2]^+\text{—}R^6\}_v\text{—}[N(R^5)_3]^+ \quad \text{(VII)}$$

wherein
each $R^5$ is independently alkyl;
each $R^6$ is independently alkylene;
v is an integer in a range of 0 to 10; and
the cationic groups have corresponding anionic counter ions.

Embodiment 8 relates to the method of Embodiment 7, further comprising synthesizing the cationic amine compound by
(a) reacting a cationic amine compound having at least one tertiary amino group and at least one quaternary amino group with a compound of the Formula (VIII):

$$L\text{-}R^6\text{-}L \quad \text{(VIII)}$$

to form a product of the Formula (IX):

$$L\text{-}R^6\text{—}\{[N(R^5)_2]^+\text{—}R^6\}_v\text{—}[N(R^5)_3]^+ \text{ and} \quad \text{(IX)}$$

(b) reacting the product of the Formula (IX) with a diamine compound of the Formula (X):

$$N(R^5)_2\text{—}R^6\text{—}N(R^5)_2 \quad \text{(X)}$$

to give a compound of the Formula (VII)

$$N(R^5)_2\text{—}R^6\text{—}\{[N(R^5)_2]^+\text{—}R^6\}_v\text{—}[N(R^5)_3]^+ \quad \text{(VII)}.$$

Embodiment 9 relates to the method of any one of Embodiments 1 to 8, wherein the leaving group L is bromide, chloride or iodide.

Embodiment 10 relates to a cationic polymer comprising x repeat units of Formula (I) and z repeat units of Formula (IV)

wherein
each $R^1$ is independently an aralkyl or substituted aralkyl;
the variable x represents an overall mole fraction of the repeat units of Formula (I) in the cationic polymer with random or block repeat unit distribution;
each R is independently a cationic group of the Formula (V) or Formula (VI)

$$*\text{—}R^3\text{—}[N(R^5)_2]^+\text{—}R^6\text{—}\{[N(R^5)_2]^+\text{—}R^6\}_v\text{—}[N(R^5)_3]^+ \quad \text{(V)}$$

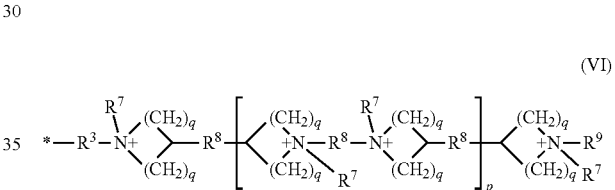

each $R^5$ is independently alkyl;
each $R^6$ is independently alkylene;
v is an integer in a range of 0 to 10;
each $R^7$ is an alkyl;
each $R^8$ is an alkylene;
each $R^9$ is an alkyl;
each q is independently an integer in a range of 1 to 2; and
p is an integer in a range of 0 to 10;
the variable z represents the overall mole fraction of the repeat units of Formula (IV) in the cationic polymer, with random or block monomer repeat unit distribution, wherein z is in a range of 0.15 to about 0.35; and
the cationic group has corresponding anionic counter ions.

Embodiment 11 relates to the cationic polymer of Embodiment 10, wherein each $R^3$ is independently $(C_6$-$C_{12})$alkylene.

Embodiment 12 relates to the cationic polymer Embodiments 10 or 11, wherein each $R^3$ is independently —$(CH_2)_n$—, wherein n is an integer from 6 to 12.

Embodiment 13 relates to the cationic polymer of Embodiment 10, wherein each $R^6$ is independently $(C_4$-$C_9)$alkylene.

Embodiment 14 relates to the cationic polymer of any one of Embodiments 10 to 13, wherein each $R^6$ is independently —$(CH_2)_m$—, wherein m is an integer from 4 to 9.

Embodiment 15 relates to the cationic polymer of any one of Embodiments 10 to 14, wherein z+x is equal to at least 0.90.

Embodiment 16 relates to the cationic polymer of any one of Embodiments 10 to 15, wherein:
R$^1$ is independently an aralkyl or substituted aralkyl;
each R is independently a cationic group of the formula:

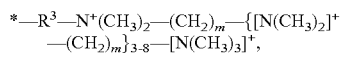

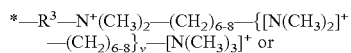

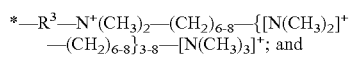

the cationic group has corresponding anionic counter ions.

Embodiment 17 relates to the cationic polymer of Embodiment 16, wherein R$^1$ is an aralkyl having an alkylene group with 2 to 6 carbon atoms and an aryl group that is phenyl that is unsubstituted or substituted with a halogen, alkyl, or alkoxy.

Embodiment 18 relates to the cationic polymer of Embodiment 16 or 17, each R is independently a cationic group of the formula:

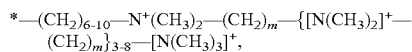

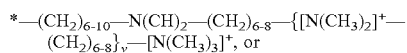

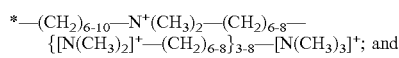

the cationic group has corresponding anionic counter ions.

Embodiment 19 relates to the cationic polymer of Embodiment 18, wherein the anionic counter ions are chloride, bromide, iodide, bicarbonate, carbonate, hydroxide, alkoxide, acetate or sulfate.

Embodiment 20 relates to a membrane comprising the cationic polymer of any one of Embodiments 10 to 19.

Embodiment 21 relates to the membrane of Embodiment 20, wherein the membrane further comprises reinforcement material.

Embodiment 22 relates to the membrane of Embodiment 20 or 21, wherein the membrane has a positive charge density equal to at least 1 milliequivalent per gram of cationic polymer.

Embodiment 23 relates to the membrane of any one of Embodiments 19 to 22, wherein the membrane has a charge density up to 5 milliequivalent per gram of cationic polymer.

Embodiment 24 relates to an electrochemical device comprising:
an anode;
a cathode;
and a membrane positioned between the anode and cathode, wherein the membrane is according to any one of embodiments 19 to 23.

Embodiment 25 relates to the electrochemical device of Embodiment 24, wherein the electrochemical device is a solid-state fuel cell.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

These abbreviations are used in the following examples: cm=centimeter, min=minutes, h=hour, mA=milliamp, mol=mole, mg=milligram, mm=millimeter, μm=micrometer, μM=micromolar, V=volt, and wt=weight.
Materials.

| Material | Source |
|---|---|
| 11-bromo-1-undecene | Sigma-Aldrich (St. Louis, MO) |
| AlEt$_2$Cl (1.0 M in heptane) | Sigma-Aldrich (St. Louis, MO) |
| TiCl$_3$ · AA (an activated grade of TiCl$_3$ used for Ziegler-Natta catalyst) | Alpha Aesar (Haverhill, MA) |
| Allylmagnesium bromide solution (1.0M in diethyl ether) | Sigma-Aldrich (St. Louis, MO) |
| 4-methylbenzyl bromide | Sigma-Aldrich (St. Louis, MO) |
| 4-fluorobenzyl bromide | Sigma-Aldrich (St. Louis, MO) |
| Benzyl bromide | Sigma-Aldrich (St. Louis, MO) |
| N,N,N',N'-tetramethyl-1,6-hexanediamine | Sigma-Aldrich (St. Louis, MO) |
| (5-bromopentyl)trimethylammonium bromide | Sigma-Aldrich (St. Louis, MO) |

All manipulations of air- and/or moisture-sensitive compounds were performed under a nitrogen atmosphere using standard Schlenk techniques. 11-Bromo-1-undecene was distilled over calcium hydride (CaH$_2$) under vacuum before using. TiCl$_3$.AA, AlEt$_2$Cl (1.0 Min heptane), allylmagnesium bromide solution (1.0 M in diethyl ether), 4-methylbenzyl bromide, 4-fluorobenzyl bromide, benzyl bromide, N,N,N'N'-tetramethyl-1,6-hexanediamine, and (5-bromopentyl)trimethylammonium bromide were all used as received.
Characterization.

$^1$H nuclear magnetic resonance (NMR) spectra were recorded at 300 MHz on a Bruker AV 300 spectrometer (Bruker Daltonics Inc., Billerica, MA) and chemical shifts were listed in parts per million (ppm) downfield from tetramethylsilane (TMS). Ionic conductivity (σ) was measured using impedance spectroscopy on a Solartron 1260 A impedance/gain-phase analyzer (Famborough, Hampshire, United Kingdom) with a two-point, in-plane geometry at frequencies ranging from 100 kHz to 100 kHz. During the ion conductivity measurements, temperature and humidity were controlled with an ESPEC SH-241 environmental chamber (ESPEC Corp., Osaka, Japan.) The temperature was held at 80° C., while the relative humidity (RH) was controlled from 50% to 100%.

The membrane resistance was acquired from the real value of the impedance where the imaginary response was zero. The ionic conductivity, σ (mS/cm), of each membrane was calculated from the equation σ=L/RA, where L is the distance between reference electrodes, R is the resistance of the membrane, and A is the cross-sectional area of the sample. Bicarbonate conductivities were measured by exchanging the bromide form membranes in 1 M sodium bicarbonate for 24 hours followed by rinsing to remove excess salt. Chloride conductivities were measured by exchanging the bromide form membranes in 1 M sodium chloride at room temperature for 24 hours followed by extensively rinsing in fresh deionized water to remove excess salt. Under an argon atmosphere, hydroxide conductivities were measured by exchanging the bromide form membranes in 1 M sodium hydroxide for 24 hours followed by rinsing to remove excess salt with degassed and deionized water. The membranes were subsequently placed into conductivity cells and immersed in deionized water that was degassed and blanketed with flowing argon gas to avoid atmospheric $CO_2$ contamination.

Water uptake was measured after drying the membranes in their corresponding counterion forms at 60° C. under vacuum for 24 h. The dried membrane was immersed in deionized water and periodically weighed on an analytical balance until a constant mass was obtained, giving the mass-based water uptake. Water uptake was calculated via ($WU=(m_{hyd}-m_{dry})/m_{dry}$), where $m_{hyd}$ is the hydrated membrane mass and $m_{dry}$ is the dry sample mass. The hydration number ($\lambda$), or the number of water molecules per ionic group, was calculated from:

$$\lambda = \left(\frac{m_{hyd} - m_{dry}}{m_{dry}}\right) \cdot \left(\frac{1000}{M_{H_2O} \cdot IEC}\right) \quad (2)$$

where $M_{H_2O}$ is the molecular mass of water (18 grams per mole), and IEC is the ion exchange capacity with units of milliequivalents of ion per gram of polymer.

The swelling ratio (SR) was characterized by the linear expansion ratio, which was determined using the difference between wet and dry dimensions of a membrane sample (3 cm in length and 1 cm in width). The calculation was based on the following equation:

$$SW(\%) = \frac{X_{wet} - X_{dry}}{X_{dry}} \times 100\% \quad (1)$$

where $X_{wet}$ and $X_{dry}$ are the lengths of the wet and dry membranes prepared as above, respectively.

To determine the titrated gravimetric ion exchange capacity (IEC) values, membranes in the OH-form were immersed in 50 mL of 0.01 M HCl standard solutions for 24 h. Then, the solutions were titrated with a standardized NaOH (0.01 M) solution to pH=7. Subsequently, the samples were washed and immersed in deionized water for 24 hours to remove the residual HCl, and then dried under vacuum at 50° C. overnight and weighed to calculate the dry masses in the Cl⁻ form. The IEC of the membranes was calculated via equation (3):

$$IEC = \left(\frac{n_{i(H^+)} - n_{f(H^+)}}{m_{dry(Cl)}}\right) \quad (3)$$

where $m_{dry(Cl)}$ is the mass of dry membranes, $n_{i(H^+)}$ is the initial amount of $H^+$ in the HCl solution, $n_{f(H^+)}$ is the final amount of $H^+$ in the HCl solution.

Fourier Transform Infrared spectroscopy (FTIR) measurements were carried out in Attenuated Total Reflection (ATR) geometry using a Bruker Optics Vertex 70 instrument (Bruker Optics Inc., Billerica, MA) equipped with Harrick Scientific MVP pro ATR accessory with a diamond ATR crystal set at an incident angle of 45° (Harrick Scientific Products, Inc., Pleasantville, New York, USA.) A total of 400 scans at a resolution of 4 cm collected at a scan rate of 5 kHz using a room temperature deuterated-triglycerine sulfate (DTGS) detector and averaged to produce a spectrum. The DTGS detector was used to access peaks at frequencies below 500 cm⁻¹. All spectra were processed using Bruker Optics Opus software (Bruker Optics Inc.).

Molecular weight and molecular weight distribution (MJM,) of the obtained bromoalkyl-functionalized poly (olefin)s were determined by gel permeation chromatography (GPC) on an Agilent PL GPC220 equipped with two Agilent PL gel 5 m MIXED-C columns using polystyrene standards and THF as the eluent at a flow of 1.0 mL min⁻¹ at 40° C. The resulting copolymer was dissolved in THF to form a 0.3 wt % solution. Subsequently, 50.00 uL polymer solution was injected into GPC and ran for 22 minutes.

Synthesis of 4-(4-methylphenyl)-1-butene

To a stirring solution of allylmagnesium bromide solution (1.20 L, 1.20 mol), 4-mnethylbenzyl bromide (185.06 g, 1.00 mol) in anhydrous tetrahydrofuran (400 mL) was added dropwise and stirred overnight at room temperature. The reaction was quenched with saturated aqueous ammonium chloride and extracted with dichloromethane. The combined organic layer was dried over $MgSO_4$ overnight and concentrated under reduced pressure. The crude product was purified by column chromatography over silica gel with hexane as the eluent to give a colorless liquid (yield 83%). Similar materials can be made, for example, by substituting 4-fluorobenzyl bromide or benzyl bromide for the 4-methylbenzyl bromide.

Synthesis of "1-(N',N'-dimethylamino)-611-(N,N,N-trimethylammonium) undecane bromide", compound (XI)

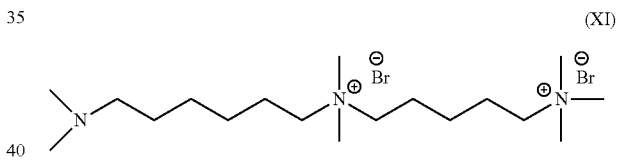

(XI)

"1-(N',N'-dimethylamino)-6,11-(N,N-trimethylammonium) undecane bromide" was synthesized as described in Zhu, L.; Pan, J.; Wang, Y.; Han. J. J.; Zhuang, L.; Hickner, M. A. Multication Side Chain Anion Exchange Membranes. Macromolecules 2016, 49, 815-824. The CAS Registry lists this compound as N'-[6-(dimethyamino)hexyl]—$N^1,N^1,N^5$, $N^5,N^5$-pentamethyl-1,5-pentanedianinium dibromide. To 400 mL of chloroform, 200 mmol of N,N,N',N'-tetramethyl-1,6-hexanediamine and 20 mmol of (5-bromopentyl)trimethylammonium bromide were dissolved, and heated at 60° C. for 12 h. After evaporation of the chloroform, the residual liquid reagent was removed under vacuum at 80-120° C. The crude product was further purified through recrystallization in methanol. The recrystallized product was dried in a vacuum oven at room temperature with a yield of 89%. The chemical structure and purity of the product was characterized by ¹H NMR in DMSO-$d_6$.

Synthesis of poly(4-(4-methylphenyl)-1-butene-co-11-bromo-1-undecene), designated M20C9

50 mL of toluene was introduced into a 100 mL glass bottle equipped with a magnetic stirrer. The reactor was injected with 11-bromo-1-undecene (2.00 g) as a co-monomer and 4-(4-methylphenyl)-1-butene (6.4 g). 0.05 g of $TiCl_3.AA$ and 1.0 mL of $AlEt_2Cl$ (1.0 M in heptane) were added to the glass bottle to initiate copolymerization. After three hours reaction at 70° C., the polymerization was quenched by methanol, followed by pouring the polymer solution into acidic methanol solution. The produced polymer was washed with acidic ethanol several times, and then dried in a vacuum oven at 60° C. overnight. The resulting copolymer was bromoalkyl-functionalized polyolefin. The table of gel permeation chromatography tests below gives the weight-averaged molecular weight and polydispersity index (PDI) of M20C9 and related brominated copolymers made by the same procedure.

| Sample | $M_w$ ($10^3$ g/mol) | PDI |
|---|---|---|
| M30C9 | 342 | 7.0 |
| M20C9 | 368 | 6.0 |
| M13C9 | 381 | 5.3 |
| M5C9  | 395 | 5.1 |

Copolymer Naming Convention

The above copolymer is referred to herein by the shorthand designation M20C9, where the M stands for a methyl substituent on the aromatic ring of the 4-phenyl-1-butene monomer; the 20 refers to 20 mol % bromoalkyl-functionalized units the C9 means the spacer between the main chain and bromo is nine methylenes. If the bromo group were to be reacted with trimethylanine to produce a terminal quaternary amine, as in the following synthesis, the resulting cationic polymer would be referred to as M20C9N.

Comparative Example 1: Synthesis of poly(4-(4-methylphenyl)-1-butene-co-11—N,N,N-trimethyl ammonium-1-undecene bromide), M20C9N The copolymer M20C9 (0.40 g) was dissolved in tetrahydrofuran (10 mL) to yield a 4 wt % solution. The solution was then cast onto a leveled PTFE mold and dried at 50° C. under ambient pressure for 24 hours followed by vacuum drying for another 24 hours at 50° C. to give a transparent, tough film (60±5 μm in thickness). Subsequently, the membranes were immersed in trimethylamine solution at 35° C. for 72 hours to obtain quaternized polyolefin-based anion exchange membranes. The resulting AEM is M20C9N (where the M stands for methyl substituent on the aromatic ring, the 20 refers to 20 mol % bromoalkyl-functionalized units; the C9 means the spacer between the main chain and $N^+C_4$ is nine methylenes).

Comparative Example 2: Synthesis of M30C9N

Copolymer M30C9N was prepared in the same manner as copolymer M20C9N above, except that the reaction mixture used to prepare the brominated copolymer corresponding to $20C_9$ in the above synthesis contained 30 mol % of the 4-(4-methylphenyl)-1-butene.

Comparative Example 3: Synthesis of M13C9N

Copolymer M13C9N was prepared in the same manner as copolymer M20C9N above, except that the reaction mixture used to prepare the brominated copolymer corresponding to M20C9 in the above synthesis contained 13 mol % of the 4-(4-methylphenyl)-1-butene.

Comparative Example 4: Synthesis of PI-M20C9N

Copolymer PI-M20C9N was prepared in the same manner as copolymer M20C9N above, except that 1-methyl-piperidine was reacted with the brominated copolymer instead of trimethylamine.

Comparative Example 5: Synthesis of PI-M30C9N

Copolymer PI-M30C9N was prepared in the same manner as copolymer PI-M20C9N above, except that the reaction mixture used to prepare the brominated copolymer corresponding to PI-M20$C_9$ in the above synthesis contained 30 mol % of the 4-(4-methylphenyl)-1-butene.

Example 1: Fabrication of Membranes and Synthesis of M20C9NC6NC5N Copolymers

The copolymer M20C9 (0.40 g) was dissolved in tetrahydrofuran (10 mL) to yield a 4 wt % solution. The solution was then cast onto a leveled PTFE mold and dried at 50° C. under ambient pressure for 24 hours followed by vacuum drying for another 24 hours at 50° C. to give a transparent, tough film (60±5 micrometers in thickness). Subsequently, the membranes were immersed in an ethanol solution of compound (XI)

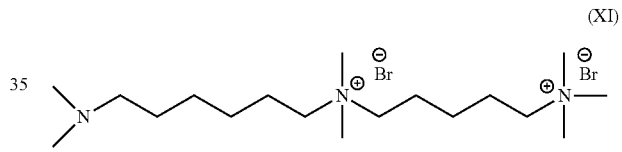

(XI)

prepared above at 50° C. for 5 days to obtain a membrane comprising the cationic polymers according to the instant disclosure, where the membrane is an anion exchange membrane (AEM). See Scheme 1.

Scheme 1.

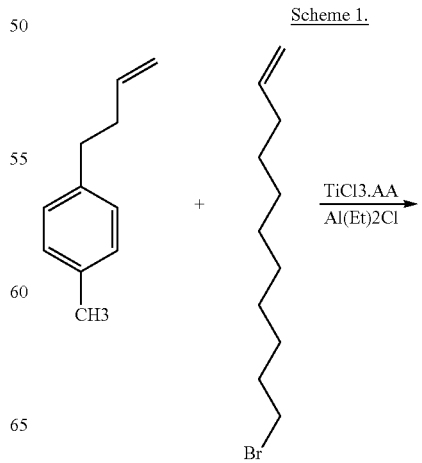

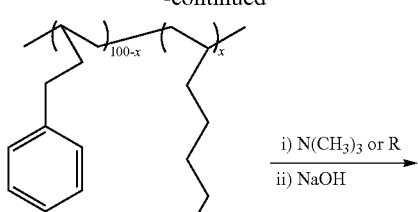

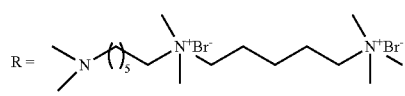

The resulting AEM is designated M20C9NC6NC5N (where the M stands for a methyl substituent on the aromatic ring, the 20 refers to 20 mol % bromoalkyl-functionalized units; the C9 means the spacer between the main chain and first quaternary amine ($N^+C_4$) is nine methylenes, the C6 represents that the spacer between the first $N^+C_4$ and the second $N^+C_4$ is 6 methylenes; the second N indicates the second $N^+C_4$ in the side chain; C5 means the spacer between the second and third ammonium group is 5 methylenes; the third N refers to the third N $C_4$ with $CH_3$ terminal groups from the cation). The resulting anion exchange membrane was initially "in the bromide form" (i.e., the counterions were bromides.) However, for testing the ionic conductivity and other properties, the bromide counterions were later exchanged for other ions, such as chloride or hydroxide, as described in the various test procedures.

Example 2: Synthesis of a Membrane of M30C9NC6NC5N

Membranes of copolymer M30C9NC6NC5N were produced as described above for M20C9NC6NC5N, except that the reaction mixture used to prepare the brominated copolymer corresponding to M20C9 in the above synthesis contained 30 mol % of the 4-(4-methylphenyl)-1-butene.

Example 3: Synthesis of a Membrane of M13C9NC6NC5N

Membranes of copolymer M13C9NC6NC5N were produced as described above for M20C9NC6NC5N, except that the reaction mixture used to prepare the brominated copolymer corresponding to M20C9 in the above synthesis contained 13 mol % of the 4-(4-methylphenyl)-1-butene.

Example 4: Synthesis of a Membrane of M5C9NC6NC5N

Membranes of copolymer M5C9NC6NC5N were produced as described above for M20C9NC6NC5N, except that the reaction mixture used to prepare the brominated copolymer corresponding to M20C9 in the above synthesis contained 5 mol % of the 4-(4-methylphenyl)-1-butene.

Example 5: Synthesis of a Membrane of F20C9NC6NC5N

Membranes of copolymer F20C9NC6NC5N were produced as described above for M20C9NC6NC5N, except that the reaction mixture used to prepare the brominated copolymer corresponding to M20C9 in the above synthesis contained 20 mol % of the 4-(4-fluorophenyl)-1-butene.

Example 6: Synthesis of a Membrane of F30C9NC6NC5N

Membranes of copolymer F20C9NC6NC5N were produced as described above for M30C9NC6NC5N, except that the reaction mixture used to prepare the brominated copolymer corresponding to M30C9 in the above synthesis contained 30 mol % of the 4-(4-fluorophenyl)-1-butene.

Example 7: Synthesis of a Membrane of F11C9NC6NC5N

Membranes of copolymer F11C9NC6NC5N were produced as described above for M20C9NC6NC5N, except that the reaction mixture used to prepare the brominated copolymer corresponding to M20C9 in the above synthesis contained 11 mol % of the 4-(4-fluorophenyl)-1-butene.

Example 8: Synthesis of a Membrane of F5C9NC6NC5N

Membranes of copolymer F11C9NC6NC5N were produced as described above for M20C9NC6NC5N, except that the reaction mixture used to prepare the brominated copolymer corresponding to M20C9 in the above synthesis contained 5 mol % of the 4-(4-fluorophenyl)-1-butene.

Example 9: Synthesis of a Membrane of H22C9NC6NC5N

Membranes of copolymer H22C9NC6NC5N were produced as described above for M20C9NC6NC5N, except that the reaction mixture used to prepare the brominated copolymer corresponding to M20C9 in the above synthesis contained 22 mol % of the 4-phenyl-1-butene.

Example 10: Synthesis of a Membrane of H28C9NC6NC5N

Membranes of copolymer 128C9NC6NC5N were produced as described above for M20C9NC6NC5N, except that the reaction mixture used to prepare the brominated copolymer corresponding to M20C9 in the above synthesis contained 28 mol % of the 4-phenyl-1-butene.

Example 11: Synthesis of a Membrane of H12C9NC6NC5N

Membranes of copolymer H12C9NC6NC5N were produced as described above for M20C9NC6NC5N, except that the reaction mixture used to prepare the brominated copolymer corresponding to M20C9 in the above synthesis contained 12 mol % of the 4-phenyl-1-butene.

Example 12: Synthesis of a Membrane of H5C9NC6NC5N

Membranes of copolymer H5C9NC6NC5N were produced as described above for M20C9NC6NC5N, except that the reaction mixture used to prepare the brominated copolymer corresponding to M20C9 in the above synthesis contained 5 mol % of the 4-phenyl-1-butene.

Swelling Behavior—Water Uptake (WU).

To demonstrate the effect of the number of charges on the side chain on the swelling behavior of the polyolefin-based AEMs, the water uptakes and swelling ratios of MxC9NC6NC5N and MxC9N samples (where x indicates the mol % of brominated monomer in the initial copolymer) with different ion exchange capacities (IECs) at room temperature in liquid water were compared. See Table 1 below. The water uptake (WU) of the polyolefin-based AEMs generally increases with increasing IEC. Although the water uptakes for all the samples increased with increasing IECs, increasing the number of cations of the side chain can largely reduce the water uptake per charged nitrogen of the AEMs. For example, with similar IECs (approximately 1.7 mmole/g,) the water uptake of M13C9NC6NC5N was 94 wt %, which was 2.5 times lower than that of M30C9N (water uptake=237 wt %). While not wishing to be bound by any specific theory, it is believed that the formation of a hydrophobic/hydrophilic microphase separation morphology is likely the reason for the lower water uptake in M13C9NC6NC5N AEMs. A lower water uptake can lead to a lower swelling ratio and better mechanical properties.

TABLE 1

Properties of the polyolefin-based membranes.

| Sample | IEC (mmol/g)[a] | IEC (mmol/g)[b] | WU (wt %) (OH$^-$)[c] | WU (wt %) (HCO$_3^-$)[c] | WU (wt %) (Cl$^-$)[c] | σ (mS/cm) (OH$^-$)[c] | σ (mS/cm) (HCO$_3^-$)[c] | σ (mS/cm) (Cl$^-$)[c] | λ (OH$^-$) | in-plane swelling(%)[c] |
|---|---|---|---|---|---|---|---|---|---|---|
| M30C9N | 1.90 | 1.76 | 237 ± 15 | 213 ± 10 | 197 ± 10 | 34 ± 4 | 8 ± 1 | 11 ± 1 | 75 | 49 |
| M20C9N | 1.23 | 1.15 | 129 ± 11 | 107 ± 8 | 90 ± 5 | 25 ± 3 | 6 ± 1 | 9 ± 1 | 58 | 32 |
| M13C9N | 0.86 | 0.76 | 53 ± 9 | 46 ± 3 | 41 ± 3 | 14 ± 2 | 3 ± 1 | 5 ± 1 | 36 | 15 |
| M30C9NC6NC5N | 3.55 | 3.07 | 357 ± 21 | 237 ± 12 | 175 ± 10 | 45 ± 3 | 9 ± 1 | 14 ± 1 | 51 | 65 |
| M20C9NC6NC5N | 2.76 | 2.41 | 193 ± 14 | 146 ± 11 | 110 ± 9 | 66 ± 4 | 14 ± 1 | 21 ± 2 | 36 | 41 |
| M13C9NC6NC5N | 2.02 | 1.69 | 94 ± 7 | 63 ± 3 | 53 ± 2 | 42 ± 2 | 9 ± 1 | 14 ± 2 | 25 | 22 |
| M5C9NC6NC5N | 0.91 | 0.73 | 30 ± 3 | 25 ± 2 | 23 ± 1 | 24 ± 2 | 5 ± 1 | 8 ± 1 | 18 | 9 |
| F30C9NC6NC5N | 3.52 | 2.88 | 169 ± 16 | 145 ± 7 | 133 ± 8 | 86 ± 5 | 21 ± 2 | 30 ± 3 | NT | NT |
| F20C9NC6NC5N | 2.72 | 2.23 | 83 ± 6 | 67 ± 5 | 59 ± 3 | 57 ± 4 | 13 ± 2 | 18 ± 3 | NT | NT |
| F11C9NC6NC5N | 1.75 | 1.42 | 67 ± 4 | 52 ± 4 | 43 ± 2 | 35 ± 2 | 7 ± 2 | 10 ± 3 | NT | NT |
| F5C9NC6NC5N | 0.9 | 0.74 | 25 ± 2 | 20 ± 2 | 21 ± 2 | 21 ± 2 | 4 ± 1 | 7 ± 1 | NT | NT |
| H22C9NC6NC5N | 3.3 | 2.68 | 289 ± 16 | 210 ± 10 | 181 ± 7 | 55 ± 4 | 12 ± 1 | 18 ± 2 | 49 | NT |
| H22C9NC6NC5N | 3.08 | 2.48 | 289 ± 16 | 210 ± 10 | 181 ± 7 | 55 ± 3 | 12 ± 1 | 18 ± 2 | NT | NT |
| H28C9NC6NC5N | 3.55 | 2.89 | 403 ± 25 | 269 ± 13 | 208 ± 9 | 67 ± 5 | 15 ± 2 | 24 ± 3 | NT | NT |
| H12C9NC6NC5N | 1.49 | 1.36 | 114 ± 10 | 85 ± 4 | 72 ± 3 | 36 ± 3 | 8 ± 1 | 11 ± 3 | NT | NT |
| H5C9NC6NC5N | 0.99 | 0.8 | 43 ± 2 | 39 ± 3 | 32 ± 2 | 24 ± 2 | 5 ± 1 | 8 ± 2 | NT | NT |
| PI-M30C9N | 1.81 | 1.65 | 183 ± 15 | 141 ± 10 | 116 ± 9 | 29 ± 2 | 8 ± 1 | 10 ± 1 | 62 | NT |
| PI-M20C9N | 1.12 | 1.01 | 103 ± 12 | 93 ± 7 | 76 ± 3 | 23 ± 3 | 6 ± 1 | 8 ± 1 | 56 | NT |

[a]Calculated from the polymer composition and the degree of functionalization.
[b]Titrated values.
[c]Measured at room temperature in water.
NT means not tested.

Ionic Transport.

When comparing the hydroxide conductivity of MxC9NC6NC5N and MxC9N membranes, the MxC9NC6NC5N samples demonstrated higher hydroxide conductivity than that of MxC9N at the same IECs. While not wishing to be bound by any specific theory, it is believed that the higher hydroxide conductivity of MxC9NC6NC5N can be attributed to the microphase formation, which can greatly facilitate ion transport in the AEM materials, thus enhancing the hydroxide conductivity. M20C9NC6NC5N exhibited a maximum hydroxide conductivity of 66 mS/cm at room temperature in liquid water, which is significantly higher than that of previous reported polyolefin-based AEMs. For example, the polystyrene-b-poly(ethylene-co-butylene)-b-polystyrene (SEBS)-based AEMs exhibited hydroxide conductivity up to 25 mS/cm at room temperature in liquid water. Others have reported polyolefin-based AEMs with bulky poly(4-methyl-1-pentene) moieties having hydroxide conductivity of 43 nS/cm at room temperature with IEC=1.92 mmol/g. And still others have reported polybutadiene-b-poly(4-methylstyrene) (PB-b-P4MS) AEMs having hydroxide conductivity of 24 mS/cm at 23° C.

For a better comparison among the samples with different IECs, the hydroxide conductivity in Table 1 can be plotted as function of (the number of absorbed water molecules per ammonium group). The approximate trend is that the hydroxide conductivity increased with λ because of the increased number of water molecules per ionic site, facilitating the transport of hydroxide ions. Under a given λ value, MxC9NC6NC5N displayed much higher hydroxide conductivity than MxC9N. For example, M20C9NC6NC5N with λ=36 showed a hydroxide conductivity of 66 mS/cm, while the M13C9N with the same λ value displayed a much lower hydroxide conductivity of 14 mS/cm. Compared to the MxC9N membranes, microphase segregation was formed between hydrophobic polyolefin backbone and hydrophilic triple-cation side chain of MxC9NC6NC5N samples, resulting an increased local ion concentration and enhanced ion mobility. Thus, the triple-cation side chain polyolefin-based AEMs demonstrated significantly higher ionic conductivities at similar 1 values due to the enhanced ion mobility.

One of the obstacles to developing the advanced AEMs is the trade-off between hydroxide conductivity and swelling ratio. M13C9NC6NC5N AEMs maintained a good balance between hydroxide conductivity and swelling ratio. For example, M13C9NC6NC5N exhibited a hydroxide conductivity of 42 mS/cm with a swelling ratio of 22%, while M30C9N with similar IEC showed lower hydroxide conductivity (34 mS/cm) but suffered from swelling (49%). While not wishing to be bound by any specific theory, it is believed that such differences can be attributed to the formation of the micro-phase segregated structures in the triple-cation side chain polyolefin-based sample that help to boost the hydroxide conductivity of membranes without over-hydration and large swelling degrees.

Alkaline Stability.

The chemical stability of the cations and polymer backbones is important because AEMs with quaternary groups are known to degrade under alkaline conditions. Examples of possible degradation pathways for the cations with alkyl spacers include beta-hydrogen (Hofmann) elimination, direct nucleophilic substitution at the alpha carbon, and nitrogen ylide formation. To evaluate the long-term alkaline stability of the AEMs, M20C9NC6NC5N and M20C9N membranes were immersed in argon-saturated 1 M NaOH solution at 80° C. for 1000 hours. The degradation of the samples was investigated by measuring the change in the hydroxide conductivity as a function of time. M20C9NC6NC5N displayed the greatest alkaline stability during the testing period. The hydroxide conductivity of M20C9NC6NC5N decreased by 15.8%. Compared to the M20C9NC6NC5N, M20C9N exhibited moderately cation stability where the hydroxide conductivity of M20C9N decreased by 20% after 1000 hours of testing. While not wishing to be bound by any specific theory, it is believed that the enhanced alkaline stability of M20C9NC6NC5N can be attributed to the micro-phase separation of hydrophobic and hydrophilic domains.

Foreseeable modifications and alterations of this invention will be apparent to those skilled in the art without departing from the scope of this invention. This invention should not be restricted to the embodiments that are set forth in this application for illustrative purposes.

What is claimed is:

1. A method for preparing a cationic polymer having a plurality of quaternary amino groups, the method comprising:

obtaining or providing a precursor polymer comprising x repeat units of Formula (I) and y repeat units of Formula (II)

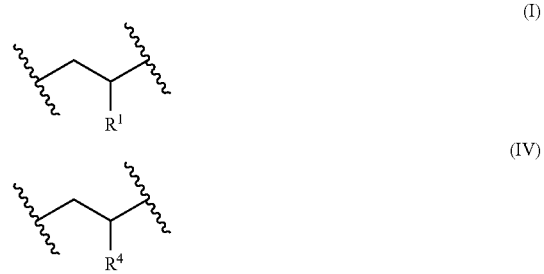

wherein
each $R^1$ is independently aralkyl or substituted aralkyl;
each $R^2$ is independently pendant *—$R^3$-L groups,
$R^3$ is alkylene having at least four carbon atoms;
L is a leaving group;
the asterisk (*) represents the point of attachment of $R^3$ to the polymer backbone;
the variable x represents an overall mole fraction of the repeat units of Formula (I) in the precursor polymer, with random or block repeat unit distribution;
the variable y represents an overall mole fraction of the repeat units of Formula (II) in the precursor polymer, with random or block monomer repeat unit distribution, wherein y is in a range of about 0.15 to about 0.35; and reacting the pendant *—$R^3$-L groups of the precursor polymer with a cationic amine compound having at least one tertiary amino group and at least one quaternary amino group to form the cationic polymer having the plurality of pendant quaternary amino groups, wherein the cationic polymer having the plurality of pendant quaternary amino groups comprises x repeat units of Formula (I) and z repeat units of Formula (IV)

-continued

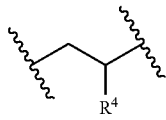
(IV)

wherein
each $R^4$ is independently a cationic group of the Formula (V) or Formula (VI)

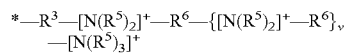
(V)

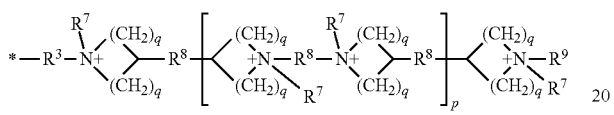
(VI)

each $R^5$ is independently alkyl;
each $R^6$ is independently alkylene;
v is an integer in a range of 0 to 10;
each $R^7$ is an alkyl;
each $R^8$ is an alkylene;
each $R^9$ is an alkyl;
each q is independently an integer in a range of 1 to 2; and
p is an integer in a range of 0 to 10; and
the variable z represents the overall mole fraction of the repeat units of Formula (IV) in the cationic polymer, with random or block monomer repeat unit distribution, wherein z is in a range of 0.15 to about 0.35; and
the cationic group has corresponding anionic counter ions.

2. The method of claim 1, wherein each $R^3$ is independently $(C_6-C_{12})$alkylene.

3. The method of claim 1, wherein each $R^6$ is independently $(C_4-C_9)$alkylene.

4. The method of claim 1, wherein the cationic amine compound that is reacted with the precursor polymer is of Formula (VII)

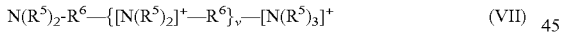
(VII)

wherein
each $R^5$ is independently alkyl;
each $R^6$ is independently alkylene;
v is an integer in a range of 0 to 10; and
the cationic groups have corresponding anionic counter ions.

5. A cationic polymer comprising x repeat units of Formula (I) and z repeat units of Formula (IV)

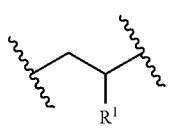
(I)

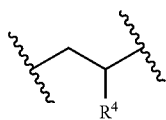
(IV)

wherein
each $R^1$ is independently aralkyl or substituted aralkyl;
the variable x represents an overall mole fraction of the repeat units of Formula (I) in the cationic polymer, with random or block repeat unit distribution;
each $R^4$ is independently a cationic group of the Formula (V) or Formula (VI)

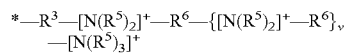
(V)

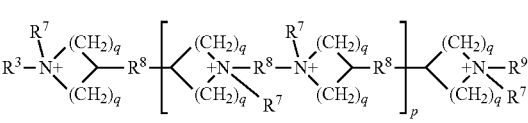
(VI)

each $R^5$ is independently alkyl;
each $R^6$ is independently alkylene;
v is an integer in a range of 0 to 10;
each $R^7$ is an alkyl;
each $R^8$ is an alkylene;
each $R^9$ is an alkyl;
each q is independently an integer in a range of 1 to 2; and
p is an integer in a range of 0 to 10;
the variable z represents the overall mole fraction of the repeat units of Formula (IV) in the cationic polymer, with random or block monomer repeat unit distribution, wherein z is in a range of 0.15 to about 0.35; and
the cationic group has corresponding anionic counter ions.

6. The cationic polymer of claim 5, wherein each $R^3$ is independently $(C_6-C_{12})$alkylene.

7. The cationic polymer of claim 5, wherein each $R^6$ is independently $(C_4-C_9)$alkylene.

8. The cationic polymer of claim 5, wherein:
each $R^4$ is independently a cationic group of the formula:

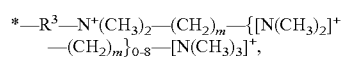

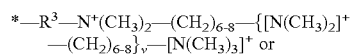

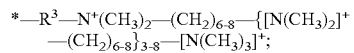

m is a variable in a range of 4 to 9;
v is a variable in a range of 0 to 10; and
the cationic group has corresponding anionic counter ions.

9. The cationic polymer of claim 8, wherein the anionic counter ions are chloride, bromide, iodide, bicarbonate, carbonate, hydroxide, alkoxide, acetate or sulfate.

10. A membrane comprising the cationic polymer of claim 5.

11. The membrane of claim 10, wherein the membrane further comprises reinforcement material.

12. The membrane of claim 10, wherein the membrane has a positive charge density equal to at least 1 milliequivalent per gram of cationic polymer.

13. The membrane of claim 10, wherein the membrane has a charge density up to 5 milliequivalent per gram of cationic polymer.

14. An electrochemical device comprising:
an anode;
a cathode; and
a membrane positioned between the anode and cathode, wherein the membrane is according to claim 10.

15. The electrochemical device of claim 14, wherein the electrochemical device is a solid-state fuel cell.

\* \* \* \* \*

UNITED STATES PATENT AND TRADEMARK OFFICE
CERTIFICATE OF CORRECTION

PATENT NO. : 11,834,544 B2  
APPLICATION NO. : 16/980320  
DATED : December 5, 2023  
INVENTOR(S) : Michael A. Yandrasits et al.

Page 1 of 1

It is certified that error appears in the above-identified patent and that said Letters Patent is hereby corrected as shown below:

In the Claims

In Column 30, Line 30, Claim 1, delete the following chemical formula corresponding to Formula (IV):

" 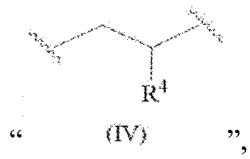 (IV) ",

And insert the following chemical formula corresponding to Formula (II):

-- 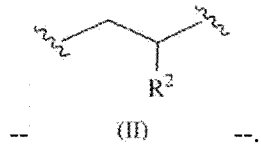 (II) --.

Signed and Sealed this  
Fifth Day of March, 2024

Katherine Kelly Vidal  
*Director of the United States Patent and Trademark Office*